(12) United States Patent
Soulhi

(10) Patent No.: US 12,501,279 B2
(45) Date of Patent: Dec. 16, 2025

(54) SYSTEMS AND METHODS FOR CONFIGURING A NETWORK NODE BASED ON A RADIO FREQUENCY ENVIRONMENT

(71) Applicant: Verizon Patent and Licensing Inc., Basking Ridge, NJ (US)

(72) Inventor: Said Soulhi, Saint Cloud, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 455 days.

(21) Appl. No.: 18/298,948

(22) Filed: Apr. 11, 2023

(65) Prior Publication Data
US 2024/0349069 A1 Oct. 17, 2024

(51) Int. Cl.
*H04W 16/20* (2009.01)
*H04W 16/18* (2009.01)

(52) U.S. Cl.
CPC .................................. *H04W 16/18* (2013.01)

(58) Field of Classification Search
CPC .............................. H04W 16/18; H04W 16/20
See application file for complete search history.

(56) References Cited

U.S. PATENT DOCUMENTS

| | | | |
|---|---|---|---|
| 2020/0028746 A1* | 1/2020 | Zawadzki | H04L 41/5009 |
| 2020/0169895 A1* | 5/2020 | Chen | G06N 3/045 |
| 2024/0098515 A1* | 3/2024 | Zhang | H04W 24/02 |

\* cited by examiner

*Primary Examiner* — Michael T Vu

(57) ABSTRACT

In some implementations, a network device may receive a set of key performance indicators (KPIs) associated with a network node. The network device may determine a KPI embedding associated with the set of KPIs. The network device may receive an image of a radio frequency (RF) environment associated with the network node. The network device may determine an RF environment embedding associated with the image of the RF environment. The network device may determine a joint embedding based on the KPI embedding and the RF environment embedding. The network device may determine at least one configuration parameter for the network node based on the joint embedding.

20 Claims, 13 Drawing Sheets

SYSTEMS AND METHODS FOR CONFIGURING A NETWORK NODE BASED ON A RADIO FREQUENCY ENVIRONMENT

BACKGROUND

A user equipment (UE) may establish a connection to a core network via a network node. The UE may communicate with the network node via downlink communications (e.g., communications from the network node to the UE) and uplink communications (e.g., communications from the UE to the network node). Radio frequency (RF) transmissions between a network node and an UE may be interfered with by surrounding objects, such as buildings, vegetation, land masses, and other environmental objects. A network node may be configured with certain configuration parameters, such as via a core network device or similar device, in order to provide connectivity to the UE. Different network nodes configured with similar configuration patterns may nonetheless perform differently due to differing RF environments surrounding the network nodes, among other external variables.

DETAILED DESCRIPTION OF EXAMPLE EMBODIMENTS

Figure 1:
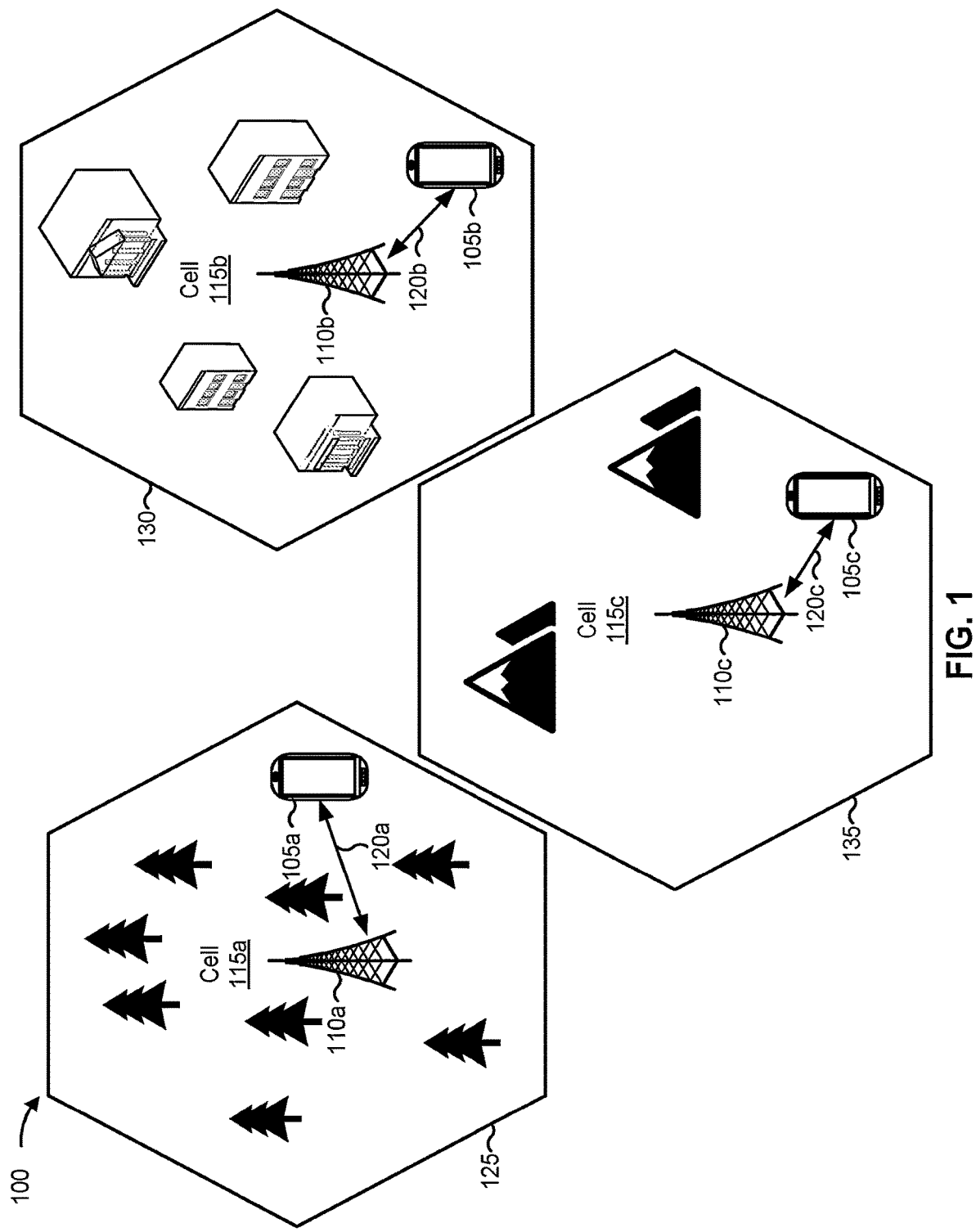
FIG. 1 is a diagram of an example wireless network associated with various radio frequency (RF) environments.

The following detailed description of example implementations refers to the accompanying drawings. The same reference numbers in different drawings may identify the same or similar elements.

A user equipment (UE) may establish a connection to a core network via a network node (e.g., a radio access network (RAN) entity), and, more particularly, via a cell associated with a network node. The network node may be configured by a core network device or a similar device with certain communication parameters associated with the cell. In some cases, multiple network nodes that are similarly configured (e.g., that have been configured with similar communication parameters) may nonetheless perform differently due to differing radio frequency (RF) environments and other external variables (e.g., variables that are not internal to the network node 110 and the configuration thereof, such as weather patterns, population density, other RF sources, or the like) affecting coverage in the corresponding cells. For example, a first network node that operates in a heavily vegetated area, such as a forest or a similar environment, may perform differently than a similarly configured network node that operates in an urban setting.

In some examples, a wireless network may employ autonomous network optimization, in which one or more communication parameters may be set based on a RAN artificial intelligence (AI)/machine learning (ML) model or similar tool. Because an RF environment associated with a network node may affect node performance, RAN AI/ML models may attempt to account for such variables. For example, an AI/ML model may associate a given network node with one of multiple RF environmental categories (e.g., urban macro, urban micro, rural macro, or a similar category) and/or utilize assumptions about other external variables (e.g., an AI/ML model may use certain assumptions associated with population density associated with a cell, building types within a cell, demographic information associated with a cell, or similar variables). For example, the Third Generation Partnership Project (3GPP) defines certain coarse-grained propagation models to be used for cell planning and/or configuration. Examples of 3GPP propagation models that may attempt to account for a surrounding RF environment or other external variables include a Hata model, a 3GPP three-dimensional (3D) channel model, a mobile and wireless communications enabler for the twenty-twenty information society (METIS) model, a COST 2100 model, a National Institute of Standards and Technology (NIST) Fifth Generation (5G) millimeter wave (mmWave) Channel Model Alliance model, and a New York University (NYU) WIRELESS model. However, these coarse-grained models do not account for all external factors and are difficult to predict and harness for a given network node, and thus provide little benefit for autonomous optimization procedures. Accordingly, in some instances a RAN AI/ML model may be manually configured (sometimes referred to as manual feature engineering) to account for a given RF environment surrounding a cell. However, manual feature engineering of a given RF environment is a complex process due to the variance across geophysical variables (e.g., land cover types, or the like) as well as biophysical variables (e.g., vegetation states, or the like).

Accordingly, certain cell sites (e.g., a single cell, a network slice, a cluster of cells, a 5G private network, or similar sites) may be similarly configured but may exhibit difference in performance caused by variations in a surrounding RF environment, external variables, and/or other geospatial variables. For example, a first cell, Cell A, and a second cell, Cell B, may be configured with the same configuration parameters, but Cell A may be underperforming while Cell B may be performing as expected. In such an example, a RAN AI/ML model may not be able to account for and/or explain the difference in performance among the two cells because traditional inputs (e.g., key performance indicators (KPIs) or similar inputs) may not be enough to predict cell performance and/or because traditional inputs may not consider geospatial characteristics impacting cell performance. Additionally, or alternatively, a traditional RAN AI/ML model may not be able to adequately determine a predicted performance of a certain radio feature within a certain RF environment (and thus whether an investment in the radio feature is warranted). As a result, network nodes may be deployed with non-optimized communication parameters, resulting in low network throughput, high network latency, and/or a high communication error rate.

Some implementations described herein enable an autonomous network optimization agent that utilizes AI/ML to generate a fine-grained representation of an RF environment of a network node, such as by generating an RF environment embedding from satellite images, aerial images, drone images, or similar images. The RF environment embedding may be utilized in the autonomous network optimization agent for providing an objective explanation of casual effects related to the RF environment and/or other external factors on the performance of a cell, a slice, a cluster of cells, a private network, or a similar network entity. In some implementations, a multimodal data driven network optimization model may be associated with the autonomous network optimization agent, which may integrate multiple modalities and/or spatiotemporal features that cover KPIs as well as the RF environment and/or other external variables. In some aspects, the autonomous network optimization agent may cluster cellular objects (e.g., cell clusters made of multiple cells and/or multiple sectors) from the embedding on all observed variables and RF environment data. As a result of autonomously accounting for an RF environment and/or other external variables when configuring a network node, the autonomous network optimization agent may optimize communication parameters for a network node, resulting in increased network throughput, decreased network latency, and/or decreased communication errors as compared to traditional RAN AI/ML models. These and other features are described in more detail below in connection with the accompanying drawings.

FIG. 1 is a diagram of an example wireless network 100 associated with various RF environments. As shown in FIG. 1, the example wireless network 100 includes UEs 105 (shown as UEs 105a through 105c) and network nodes 110 (e.g., RAN devices, shown as network nodes 110a through 110c) communicating via cells 115 (shown as cells 115a through 115c).

More particularly, the example wireless network 100 may include multiple UEs 105, each communicating with a respective network node 110. The example wireless network 100 may be a fourth generation (4G) and/or a Long Term Evolution (LTE) network, a 5G and/or New Radio (NR) network, or a similar network. In that regard, each network node 110 may be associated with an NR or 5G network node (sometimes referred to as a gNodeB (gNB)), an LTE or 4G network node (sometimes referred to as an eNodeB (eNB)), a RAN device, or a similar network device. Additionally, or alternatively, each network node 110 may be a base station (BS), a centralized unit (CU) of a disaggregated BS in an open RAN (O-RAN) architecture, a distributed unit (DU) of a disaggregated BS in an O-RAN architecture, and/or a radio unit (RU) of a disaggregated BS in an O-RAN architecture, among other types of network devices.

As shown in FIG. 1, each network node 110 may provide coverage for a particular area, sometimes referred to as a cell 115 (shown in FIG. 1 as cells 115a through 115c). The network node 110 may be capable of providing coverage to a relatively large geographic area, sometimes referred to as a macrocell, or to a smaller area, sometimes referred to as a microcell, a picocell, a femtocell, a private cell, an onsite cell, and/or a similar cell. For example, a macro network node may be associated with a large antenna array and a high transmit power, providing broad coverage to many users within a macrocell, while an onsite network node may be associated with a smaller antenna array and/or a lower transmit power than a macro network node, and may provide coverage to a limited number of subscribers located within a particular building, located on a particular premises, or the like.

As shown in FIG. 1, when a UE 105 is within a coverage of a cell 115, the UE 105 may communicate with the corresponding network node 110 via a communication link 120 (sometimes referred to as a wireless communication link and/or an access link, shown in FIG. 1 as communication links 120a through 120c). The communication link 120 may include an uplink and a downlink. The uplink may be associated with communications transmitted by the UE 105 and received by the network node 110, and the downlink may be associated with communications transmitted by the network node 110 and received by the UE 105. In some examples, the network node 110 may schedule uplink and downlink communications in order to minimize collisions at the network node 110 and/or the UE 105, and/or in order to minimize interference with communications by neighboring network devices and/or neighboring cells 115.

In some examples, a network node 110 may be configured with certain communication parameters by a core network device or similar device in order to communicate, via a cell 115 associated with the network node 110, with one or more UEs 105. More particularly, a network node 110 may be configured with a transmit power level for downlink communications, a frequency band for uplink and/or downlink communications, and similar communication parameters associated with providing coverage, via a cell 115 associated with the network node 110, to UEs 105. In some examples, multiple network nodes 110 may be configured with the same or similar communication parameters, but may nonetheless exhibit different performance metrics and/or KPIs (e.g., the network nodes 110 may experience different call drop rates, different numbers of retransmissions, different latency, or the like).

In some examples, differences in performance at various network nodes 110 may be caused by a surrounding RF environment at each network node 110 and/or other external variables affecting coverage at each network node 110. An RF environment may correspond to a geographical area covered by a transmitter (e.g., a network node 110). In some cases, the RF environment may be described by, and/or associated with, certain physical parameters, such as environmental data (e.g., agriculture, soils, climate, and/or similar environmental data), hydrography data (e.g., oceans, lakes, rivers, and/or similar hydrography date), elevation data (e.g., terrain, relief, and/or similar elevation data), and/or similar physical parameters. In some examples, an RF environment may be represented by elevation models (e.g., surface models) that capture the features protruding from the Earth's surface, such as man-made structures, vegetation, or other features. External variables may correspond to other external factors affecting performance of a network node 110, which may be associated with certain administrative data (e.g., boundaries, cities, planning, and/or similar administrative data), socioeconomic data (e.g., demographics, economy, and/or similar socioeconomic data), transportation data (e.g., roads, railways, airports, and/or similar transportation data), and/or similar external data.

More particularly, as shown by reference number 125, a first cell 115a may be associated with an RF environment including heavy vegetation, such as an RF environment including many trees, bushes, shrubs, or similar vegetation, which may affect cell performance in a certain way. In contrast, as shown by reference number 130, a second cell 115b may be an urban area that does not include such vegetation but that includes other obstacles that might affect cell performance, such as many buildings, houses, vehicles, people, and other features common to an urban setting. As shown by reference number 135, a third cell 115*c* may differ from the first two cells 115*a*, 115*b* in that the cell does not include heavy vegetation or many buildings, but may nonetheless be associated with a mountainous region or similar RF environment that may affect cell performance. In such examples, if a core network device configures each of the three network nodes 110*a*, 110*b*, 110*c* in a similar manner (e.g., if each of the three network nodes 110*a*, 110*b*, 110*c* is configured with the similar power transmit levels, frequency bands, beam configurations, or similar communication parameters), the network nodes 110*a*, 110*b*, 110*c* may exhibit differing performances due to the disparate RF environments.

In some implementations, an autonomous network optimization agent may account for a surrounding RF environment when configuring a network node 110, thereby optimizing communication parameters based on geospatial features and/or other external variables that may affect cell performance. Additionally, or alternatively, the autonomous network optimization agent may determine a causality of a surrounding RF environment on cell performance, thereby improving cell and/or wireless network device planning. Aspects of an autonomous network optimization agent that may account for an RF environment and/or other external variables are described in more detail below in connection with FIGS. 2-3G.

As indicated above, FIG. 1 is provided as an example. Other examples may differ from what is described with regard to FIG. 1.

Figure 2:
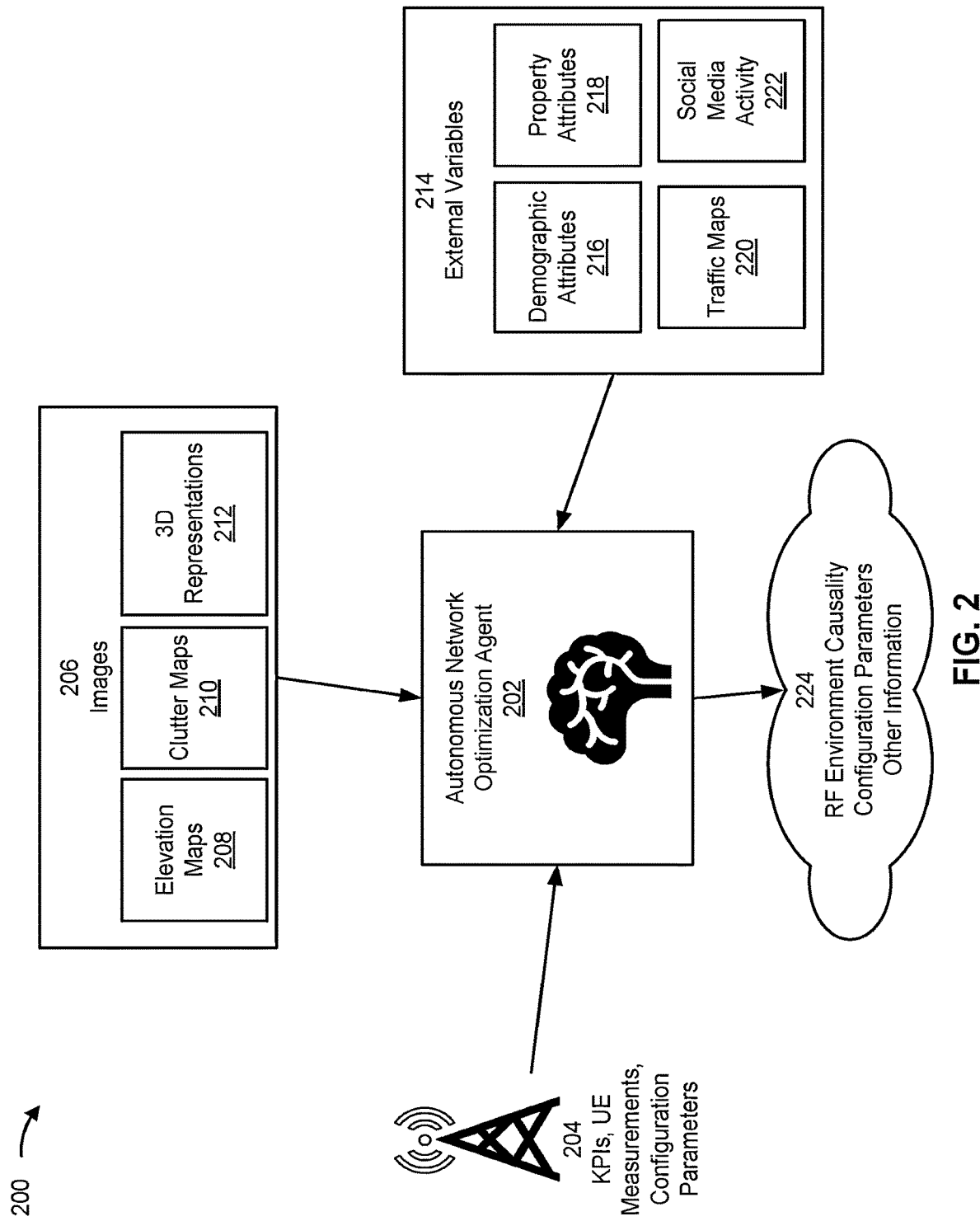
FIG. 2 is a diagram of an example associated with configuring a network node based on an RF environment.

FIG. 2 is a diagram of an example 200 associated with configuring a network node 110 based on an RF environment. As shown in FIG. 2, example 200 includes an autonomous network optimization agent 202. The autonomous network optimization agent 202 may be associated with an objective explainability capability of the causal effects related to the RF environment and other external factors on the performance of a cell, a slice, a cluster of cells, a private 5G network, or a similar group of network entities. In some implementations, the autonomous network optimization agent 202 may be associated with a multimodal data driven network optimization model that integrates multiple modalities and spatiotemporal features, and thus the autonomous network optimization agent 202 may include a capability to optimize communication parameters based on a combination of KPIs, an RF environment, and other external variables. In some implementations, the KPIs may be associated with numerical performance data associated with a network node 110, such as data associated with a connection rate associated with the network node 110, a call drop rate associated with the network node 110, a voice quality measure associated with the network node 110, or the like.

In some implementations, the autonomous network optimization agent 202 may account for a complex RF environment associated with a network node 110 by receiving images (e.g., topographic maps, aerial images, satellite images, or the like) associated with the RF environment, from which the autonomous network optimization agent 202 may learn data abstractions and establish an effective representation from low levels to the highest semantic interpretations of the RF environment pertinent to the cell performance (e.g., hills, vegetations, structures, and other environmental features). The autonomous network optimization agent 202 may also utilize other external factors and/or external variables, such as population density, road density and/or type, social media usage, socioeconomic data, or the like, to determine and/or predict causal effects on the performance of a cell. In some implementations, the autonomous network optimization agent 202 may use multimodal learning, such as by clustering cellular objects (e.g., cell clusters made of multiple cells where each cell is divided into multiple sectors) from an embedding associated with all observed variables and RF environment data. In some implementations, "embedding" (sometimes referred to as an embedding space) may refer to a way to represent data that can be utilized by the autonomous network optimization agent 202 and/or AI/ML model (e.g., a network entity may take a piece of data and create a corresponding vector in an embedding space). In that regard, the autonomous network optimization agent 202 may receive various inputs, such as performance statistics and/or measurements, configuration parameters, images of an RF environment, and/or external variables, and the autonomous network optimization agent 202 may determine and/or predict a causality of an RF environment on a network node 110 performance, may determine and/or predict one or more configuration parameters to be implemented by the network node 110 in order to optimize performance, and/or may determine and/or predict other information associated with the network node 110.

More particularly, as shown by reference number 204, the autonomous network optimization agent 202 may receive (e.g., as inputs to an AI/ML model) KPIs associated with a network node 110, UE 105 measurements associated with the network node 110 (e.g., measurements performed by one or more UEs 105 being served by the network node 110 and collected by the network node 110 to be provided to the autonomous network optimization agent 202), configuration parameters associated with the network node 110, or similar data associated with an objective performance and/or setting of the network node 110.

Moreover, as shown by reference number 206, the autonomous network optimization agent 202 may receive (e.g., as inputs to the AI/ML model) one or more images associated with an RF environment of the network node 110. In some implementations, the one or more images may include one or more satellite and/or aerial images and/or one or more elevation maps 208 associated with a geographic area, which may be associated with a photograph of a surrounding area to the network node 110 that is captured by a satellite, an aerial vehicle (e.g., a drone), other airborne camera. In some implementations, a spatial resolution of an elevation map 208 (described in more detail below in connection with FIG. 3B) may be dependent on a type of cell associated with the network node 110. For example, for rural cells, a spatial resolution may be between 10-50 meters (m), for suburban cells, a spatial resolution may be between 5-10 m, and for an urban cell, a spatial resolution may be between 1-5 m. Additionally, or alternatively, the one or more images may include one or more clutter maps 210 associated with a geographic area. A clutter map 210 may be an image that shows and/or highlights obstacles that may impede a signal's path within a cell 115. For example, a clutter map 210 may be a map that highlights buildings, large trees, and similar features within a geographic area. Additionally, or alternatively, the one or more images may include one or more 3D representations 212 of a geographic area. A 3D representation 212 may be associated with a computer-generated representation of a geographic area, such as a computer-generated representation of buildings within an urban cell. In some other implementations, other types of images and/or representations of an RF environment may be employed without departing from the scope of the disclosure.

In some implementations, as shown by reference number 214, the autonomous network optimization agent 202 may receive (e.g., as inputs to the AI/ML model) data associated with one or more external variables associated with the network node 110. In some implementations, the data associated with one or more external variables may include data associated with demographic attributes 216 associated with a cell 115 being served by the network node 110. In some other implementations, the data associated with one or more external variables may include data associated with property attributes 218 associated with the cell 115 being served by the network node 110. In some other implementations, the data associated with one or more external variables may include data associated with traffic maps 220 associated with the cell 115 being served by the network node 110. In some other implementations, the data associated with one or more external variables may include data associated with social media activity 222 associated with the cell 115 being served by the network node 110. Other types of external variable information may be employed without departing from the scope of the disclosure.

In some implementations, as shown by reference number 224, the autonomous network optimization agent 202, based on the various inputs described above (e.g., KPIs, UE measurements, configuration parameters, RF environment images, external variables, or the like), may create a multimodal AI representation of the data in order to predict certain features associated with the network node 110, such as an RF environment causality on network node performance, one or more configuration parameters to be employed to optimize network node performance, or similar information. "Multimodal AI" may refer to a type of AI system capable of processing and relating multimodal data. Traditional AI systems may be considered to be unimodal, because they are designed to perform a particular task, such as image processing, speech recognition, or the like, using a single input or modality (e.g., an image, speech, or similar inputs). For AI systems designed to deal with a single source of information, the AI system may ignore certain contextual and supporting information when making deductions. Multimodal AI systems, on the other hand, may be capable of processing a variety of data modalities in order to understand and analyze information. Example multimodal AI systems include DALL-E systems, a large-scale image and noisy-text (ALIGN) embedding systems, contrastive language image pre-training (CLIP) systems, multimodal, multi-task retrieval across languages (MURAL) systems, video-audio-text transformer (VATT) systems, foundational language and vision alignment (FLAVA) systems, neural visual world algorithm (NUWA) systems, Florence systems, or similar multimodal AI systems.

In some implementations, the autonomous network optimization agent 202 may utilize a multimodal AI system to predict certain features associated with the network node 110, such as an RF environment causality on network node performance, one or more configuration parameters to be employed in order to optimize network node performance, or similar information, by creating a plurality of embeddings associated with the various inputs using a plurality of machine learning sub-models, creating a joint embedding from the plurality of embeddings, and/or predicting an RF environment causality, optimized configuration parameter, or similar information using a machine learning model based on the joint embedding. Additional features associated with the autonomous network optimization agent 202 determining and/or predicting RF environment causality, configuration parameters, and/or other information based on KPIs, UE measurements, configuration parameters, RF environment images, external variable information, and similar inputs are described in more detail below in connection with FIGS. 3A-3G.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIGS. 3A-3G are diagrams of another example 300 associated with configuring a network node based on an RF environment. As shown in FIGS. 3A-3G, example 300 includes the autonomous network optimization agent 202 described above in connection with FIG. 2.

Figure 3A:
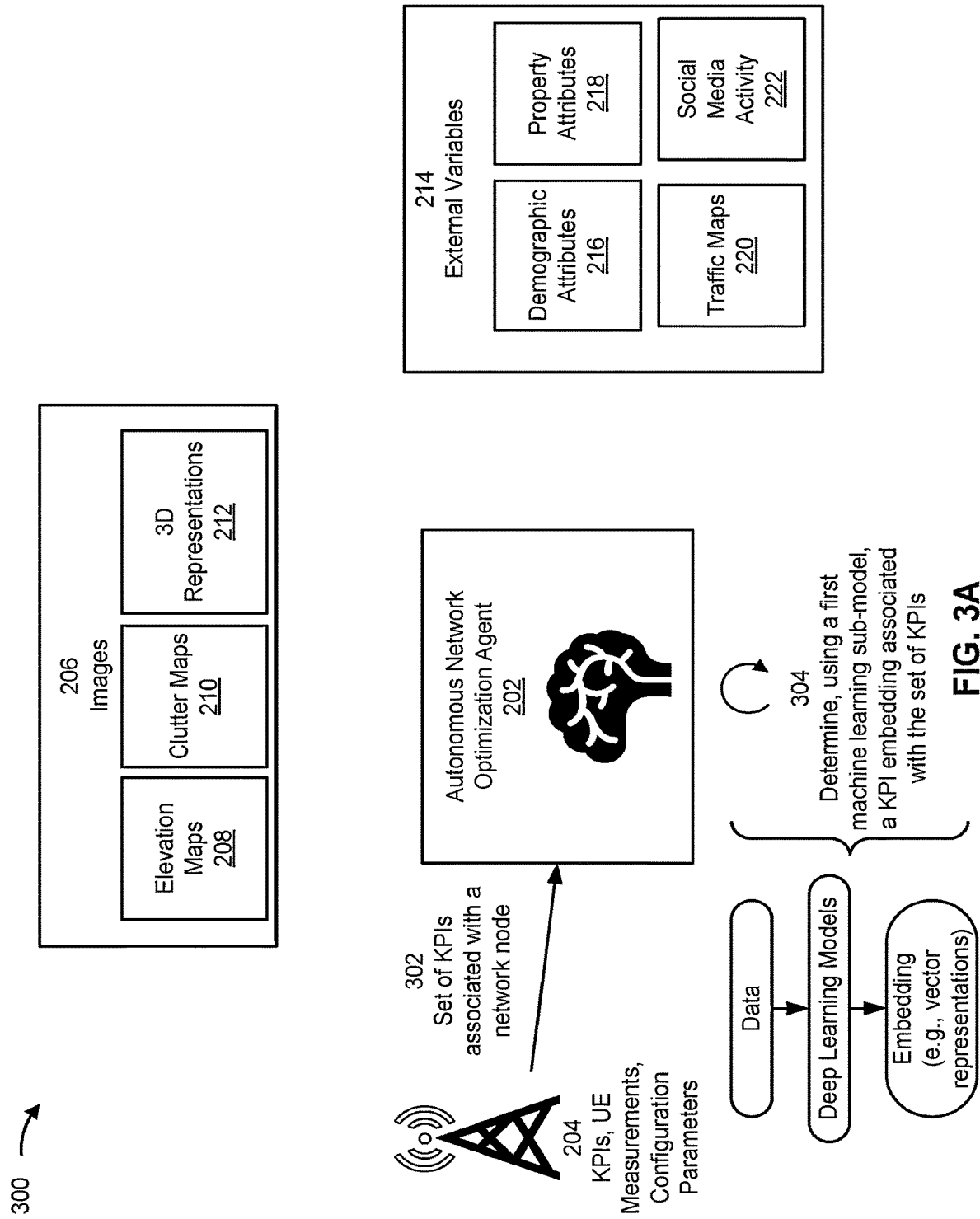
FIGS. 3A-3G are diagrams of another example associated with configuring a network node based on an RF environment.

As shown in FIG. 3A, in some implementations, the autonomous network optimization agent 202 may build and/or train a first machine learning sub-model associated with the KPIs and/or similar UE 105 measured and/or network node 110 collected performance information (e.g., the information described above in connection with reference number 204). In such implementations, as shown by reference number 302, the autonomous network optimization agent 202 may receive (e.g., as input to the first machine learning sub-model) a set of KPIs or similar network performance information (e.g., UE measurements, configuration parameters, or similar information described above in connection with reference number 204) associated with a network node 110. In some implementations, the autonomous network optimization agent 202 may receive the one or more KPIs or similar information from the network node 110 or another network device (e.g., a core network device). Additionally, or alternatively, in some implementations, the autonomous network optimization agent 202 may collect performance data from the network node 110, with the set of KPIs being based on the performance data. Put another way, in some other implementations, the autonomous network optimization agent 202 may receive network performance data from the network node 110, and the autonomous network optimization agent 202 and/or an associated network device (e.g., a core network device) may build a KPI dataset based on the network performance data.

As shown by reference number 304, the autonomous network optimization agent 202 may determine, using the first machine learning sub-model, a KPI embedding associated with the set of KPIs or similar performance information. As shown in FIG. 3A, an embedding may include a vector representation of data, determined using a deep learning model or similar method. In some implementations, the autonomous network optimization agent 202 may use an autoencoder or similar variant (e.g., a variational autoencoder, an adversarial autoencoder, or a similar autoencoder) to generate a KPI embedding (sometimes referred to as a KPI embedded space and/or a KPI latent space). "Autoencoder" may refer to a type of unsupervised AI neural network used to learn efficient coding of unlabeled data. In such implementations, the autoencoder may include two networks, such as a recognition network (e.g., an encoding network) and a generative network (e.g., a decoding network). The encoder network may reduce the dimension of inputs, which may enable the autoencoder to capture important features of the original data. The decoder network may restore the original data from the compressed representation. In some implementations, weights used by an autoencoder may be updated to closely match the original data by backpropagation or similar techniques.

Additionally, or alternatively, the autonomous network optimization agent 202 may build and/or train a machine learning sub-model associated with other modalities, such as a machine learning sub-model that is associated with the RF environment images described above in connection with reference number 206. In such implementations, the RF environment sub-model may use one or more images (e.g., one or more of the images described above in connection with reference number 206) as input, and the autonomous network optimization agent 202 may output an RF environment embedding (e.g., a vector representation of the RF environment). In some implementations, the autonomous network optimization agent 202 or an associated network device may generate certain images to be used as input to the RF environment sub-model, such as by generating a hyperspectral geospatial dataset including images associated with spatial and spectral content associated with polygons corresponding to areas of cells 115 area associated with various network nodes 110. In some implementations, the image dataset may be generated from satellite images, aerial images, 3D representations, clutter maps, elevation maps, or similar maps or images.

More particularly, "satellite images" may refer to images of Earth collected by imaging satellites operated by various entities (e.g., such as the Sentinel-2 imaging mission). Satellite images may be used for tracking and measuring human and natural activity across the Earth or for other purposes. In some examples, satellite images may be obtained from satellite imaging companies that license photographs of the Earth to various entities. Additionally, or alternatively, satellite images may be supplemented with aerial photography (e.g., photographs obtained from an aerial vehicle), which may be associated with a higher resolution than satellite imagery (although at a higher cost per square meter).

In some implementations, satellite images may be associated with multiple types of resolution, such as spatial resolution, spectral resolution, temporal resolution, radiometric resolution, and/or geometric resolution. "Spatial resolution" may refer to the pixel size of an image representing the size of the surface area (e.g., in square meters ($m^2$)) being measured on the ground, determined by the sensors' instantaneous field of view (IFOV). "Spectral resolution" may refer to the wavelength interval size (discrete segment of the electromagnetic spectrum) and number of intervals that the sensor is measuring. "Temporal resolution" may refer to an amount of time (e.g., days) that passes between imagery collection periods for a given surface location. "Radiometric resolution" may refer to an ability of an imaging system to record many levels of brightness (e.g., contrast) and to the effective bit-depth of the sensor (e.g., number of grayscale levels). Radiometric resolution may be expressed as 8-bit (e.g., 0-255 levels), 11-bit (e.g., 0-2047 levels), 12-bit (e.g., 0-4095 levels), or 16-bit (e.g., 0-65,535 levels). "Geometric resolution" may refer to a satellite sensor's ability to effectively image a portion of the Earth's surface in a single pixel, and may be expressed in terms of ground sample distance (GSD). GSD may be associated with the overall optical and systemic noise sources and may be used to compare how well one sensor can "see" an object on the ground within a single pixel. For example, a satellite with a GSD of 30 m means that the smallest unit that maps to a single pixel within an image is approximately 30 m by 30 m.

In some implementations, satellite images or other maps or images associated with input to the autonomous network optimization agent 202 may be associated with one or more geographic information system (GIS) data layers. GIS data layers may refer to groups of objects associated with a map that include one or more separate items, but which are manipulated as a single unit. In some examples, GIS data layers may reflect collections of objects that may be added on top of a map to designate a communication on association. Various GIS data layers may include an imagery layer, an elevation layer, a water features layer, a landmarks layer, a boundaries and demographics layer, a transportation layer, or a layer associated with other data or information.

Figure 3B:
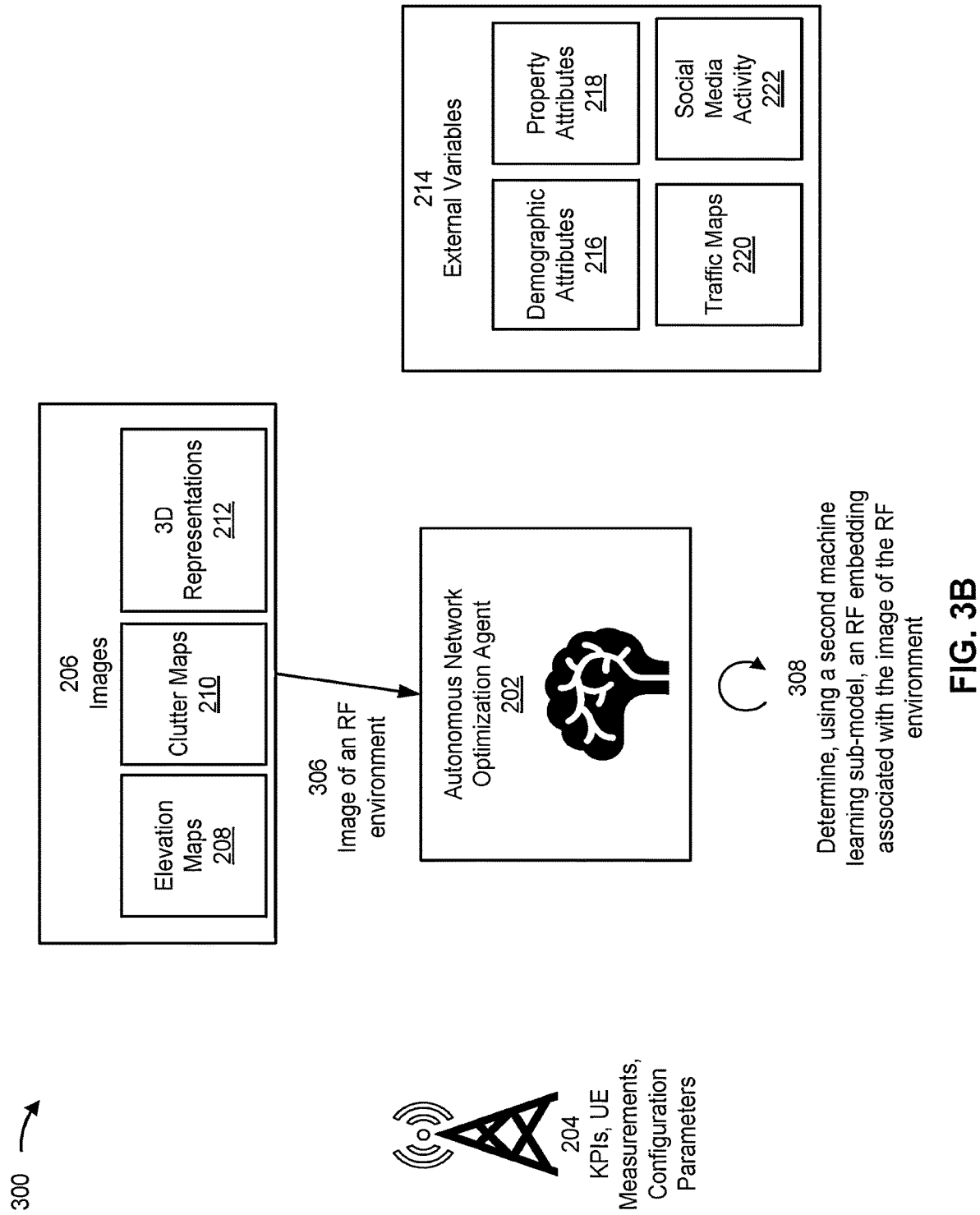

As shown in FIG. 3B, and as indicated by reference number 306, the autonomous network optimization agent 202 may receive an image of an RF environment associated with the network node 110. In some implementations, the image of the RF environment associated with the network node 110 may be associated with a satellite image, an aerial image, an elevation map, a clutter map, a 3D model, or a similar image. Additionally, or alternatively, in some implementations, the autonomous network optimization agent 202 may generate one or more images to be used as inputs to the second machine learning sub-model (e.g., the RF environment sub-model). For example, the autonomous network optimization agent 202 may receive another image, such as a satellite image of a larger region than an area associated with a cell 115 of the network node 110 (e.g., a satellite image obtained from the Sentinel-2 mission or a similar satellite image), and the autonomous network optimization agent 202 may extract the image of the RF environment associated with the network node 110 from the other image (e.g., the larger image).

Additionally, or alternatively, the autonomous network optimization agent 202 may be configured with certain parameters associated with the larger image and/or used for generating the images to be used as inputs to the RF environment sub-model. For example, the autonomous network optimization agent 202 may be configured with input such as a spatial resolution of an image (e.g., 60 m, or a similar spatial resolution), a spectral band associated with the image (e.g., for a 60 m resolution, a B1 band associated with a wavelength of 443 nm, a B9 band associated with a wavelength of 940 nm, a B10 band associated with a wavelength of 1375 nm, or a similar spectral band), a cell type associated with the image (e.g., a frequency associated with the cell, a power level associated with the cell, or similar parameters), a cell altitude associated with the image, a cell longitude associated with the image, a time associated with a resulting image, or similar parameters. Based on the input parameters and/or other parameters, the autonomous network optimization agent 202 or other network device may process satellite images, aerial images, or similar images to extract sub-images associated with various cells. For example, the autonomous network optimization agent 202 or other network device may extract sub-images that are tiles of fixed size (sometimes referred to as granules). In some implementations, a size of a tile and/or a granule may be dependent on a cell type associated with the image.

Additionally, or alternatively, the autonomous network optimization agent 202 or another network device may augment an image (e.g., one of the extracted images, tiles, and/or granules, described above) as part of building the RF environment dataset. For example, the autonomous network optimization agent 202 and/or another network device may process an image by randomly cropping the image, randomly flipping and/or rotating the image, adding noise to the image (e.g., random Gaussian noise, red noise, or a similar noise), or by performing another processing or augmentation step. As a result, an RF environment dataset may include a set of augmented images associated with various cells as candidate images to be used to form an RF environment embedding, with the augmented images avoiding overfitting and improving trainability.

As shown by reference number 308, the autonomous network optimization agent 202 may determine, using a second machine learning sub-model, an RF environment embedding associated with the image of the RF environment. More particularly, the autonomous network optimization agent 202 may process one or more images (e.g., one or more images associated with the RF environment dataset, described above) in order to create an RF environment embedding (e.g., a vector representation of the RF environment). In some implementations, the autonomous network optimization agent 202 may determine the RF environment embedding using representation learning. For example, the autonomous network optimization agent 202 may process the one or more images by focusing on high level features by using representation learning to obtain semantically meaningful features that do not focus on low-level features (e.g., edges, color, texture, contrast, or similar low-level features, which may be suboptimal for semantic clustering of the RF environment). Put another way, the machine learning sub-model used to form an RF environment embedding may be capable of extracting high-level visual features (e.g., trees, hills, buildings, and similar high-level visual features) that may impact a wireless network performance.

In some implementations, the representation learning may be associated with a multilayer perceptron (MLP) model, a convolution neural network (CNN) model, and/or a vision transformer (ViT) model. Put another way, the autonomous network optimization agent 202 may utilize a MLP model, a CNN model, a ViT model, or a similar machine learning model that may be capable of learning how to map high-dimensional data to a lower-dimensional embedding space, while placing semantically similar samples closer together in the embedding space and while placing semantically distinct samples further apart from each other in the embedding space.

Additionally, or alternatively, the autonomous network optimization agent 202 may determine the RF environment embedding using a sinusoidal representation network. For example, in implementations involving a high-band 5G cell (e.g., 28 gigahertz (GHz)), the autonomous network optimization agent 202 may utilize a sinusoidal representation network as a machine learning sub-model used to generate the RF environment embedding. A sinusoidal representation network may be associated with a neural network that has periodic activation functions (e.g., corresponding to sine waves) as non-linearities. In some implementations, a sinusoidal representation network may be capable of capturing high-frequency details of an environment (e.g., 3D buildings). Additionally, or alternatively, the autonomous network optimization agent 202 may initiate weights associated with the RF environment sub-model randomly, or else may reuse weights associated with another network. Moreover, in some implementations, the autonomous network optimization agent 202 may utilize transfer learning for creating the RF environment embedding. For example, the autonomous network optimization agent 202 may reuse the first n convolution layers from a network trained on the ImageNet and/or other datasets (e.g., InceptionResNet, MobileNet, or a similar dataset).

In some other implementations, in addition to or instead of representation learning, the autonomous network optimization agent 202 may use contrastive learning to generate the RF network embedding. When using contrastive learning, the autonomous network optimization agent 202 may learn representations that are invariant to image augmentations in a self-supervised manner. In some implementations, contrastive learning may avoid a trivial degenerate solution (e.g., a case where representations are constant and do not depend on the input images) by pulling representations of augmented visions and/or views of the same image closer to each other (e.g., contrasting positives) while simultaneously pushing different images away from each other (e.g., contrasting negatives) in a representation space. In some implementations, the autonomous network optimization agent 202 may implement noise-contrastive estimation (NCE), which may be associated with a loss function that enables learning representations by comparing positive and negative sample pairs.

Based on using a machine learning sub-model (e.g., a sub-model associated with representation learning, a sub-model associated with contrastive learning, or another sub-model), the autonomous network optimization agent 202 may output one or more RF environment embeddings. In some implementations, the RF environment embedding may be associated with a time of year. A time of year may impact an RF environment, because, for example, the RF environment may include more foliage in the spring than in the fall, certain environmental features may be covered in snow in the winter but not in the summer, or the like. In that regard, the autonomous network optimization agent 202 may generate multiple RF environment embeddings for a cell, such as a winter RF environment embedding, a spring RF environment embedding, a summer RF environment embedding, a fall RF environment embedding, and so forth. In some implementations, the RF environment embedding may include a lower space dimensionality than an input image. Additionally, or alternatively, in the RF environment embedding space, similar cell environments may result in similar embeddings. For example, two cells in a certain region may have similar embeddings because they exhibit similar geospatial characteristics.

Figure 3C:
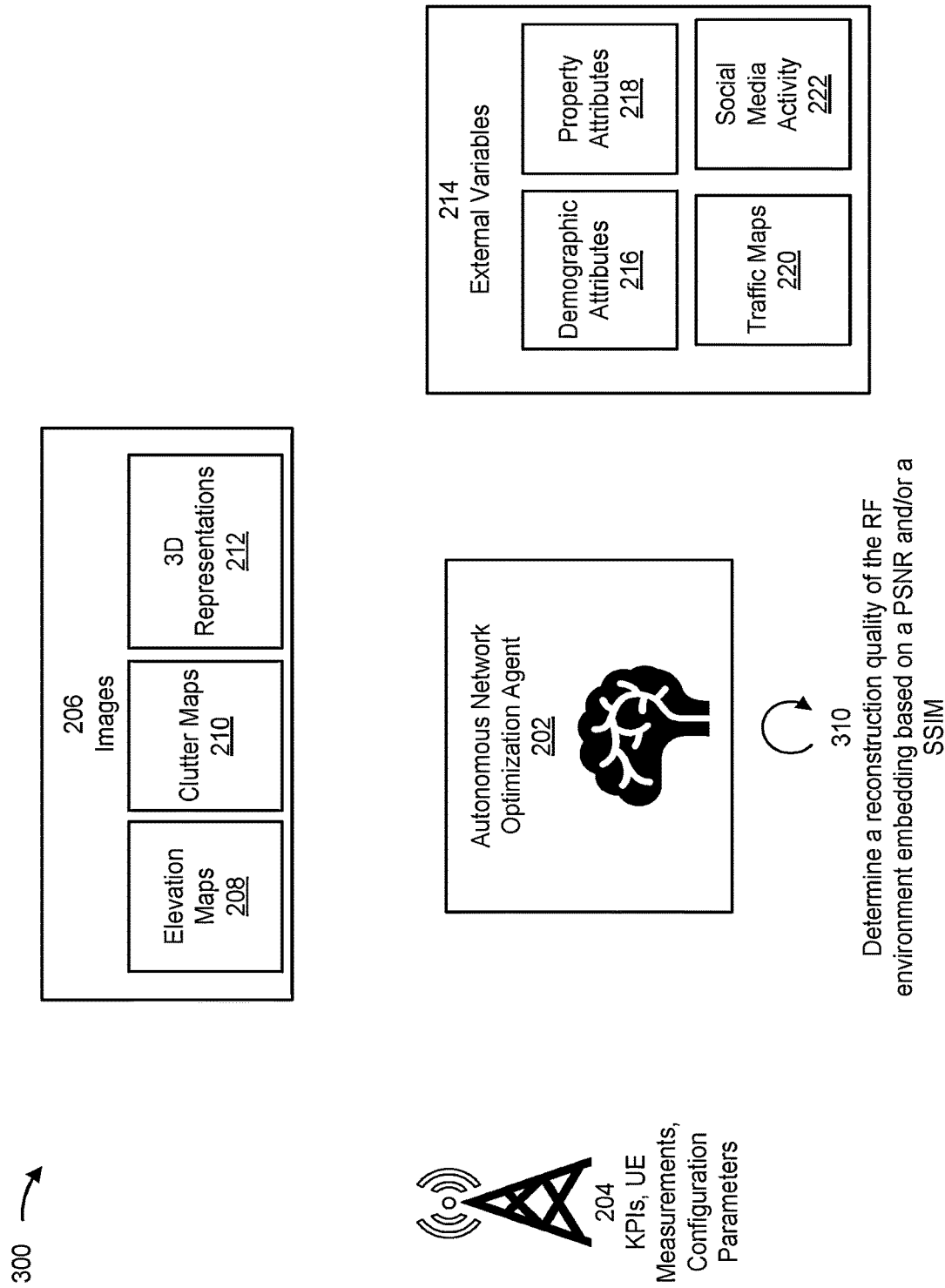

As shown in FIG. 3C, and as indicated by reference number 310, in some implementations the autonomous network optimization agent 202 may determine a reconstruction quality of the RF environment embedding. Put another way, the autonomous network optimization agent 202 may be used to quantify a reconstruction quality for RF environment images. For example, the autonomous network optimization agent 202 may quantify a reconstruction quality of RF environment images based on a peak signal-to-noise ratio (PSNR), a structural similarity index measure (SSIM), or similar tool in order to ensure that an RF environment embedding is high quality.

Figure 3D:
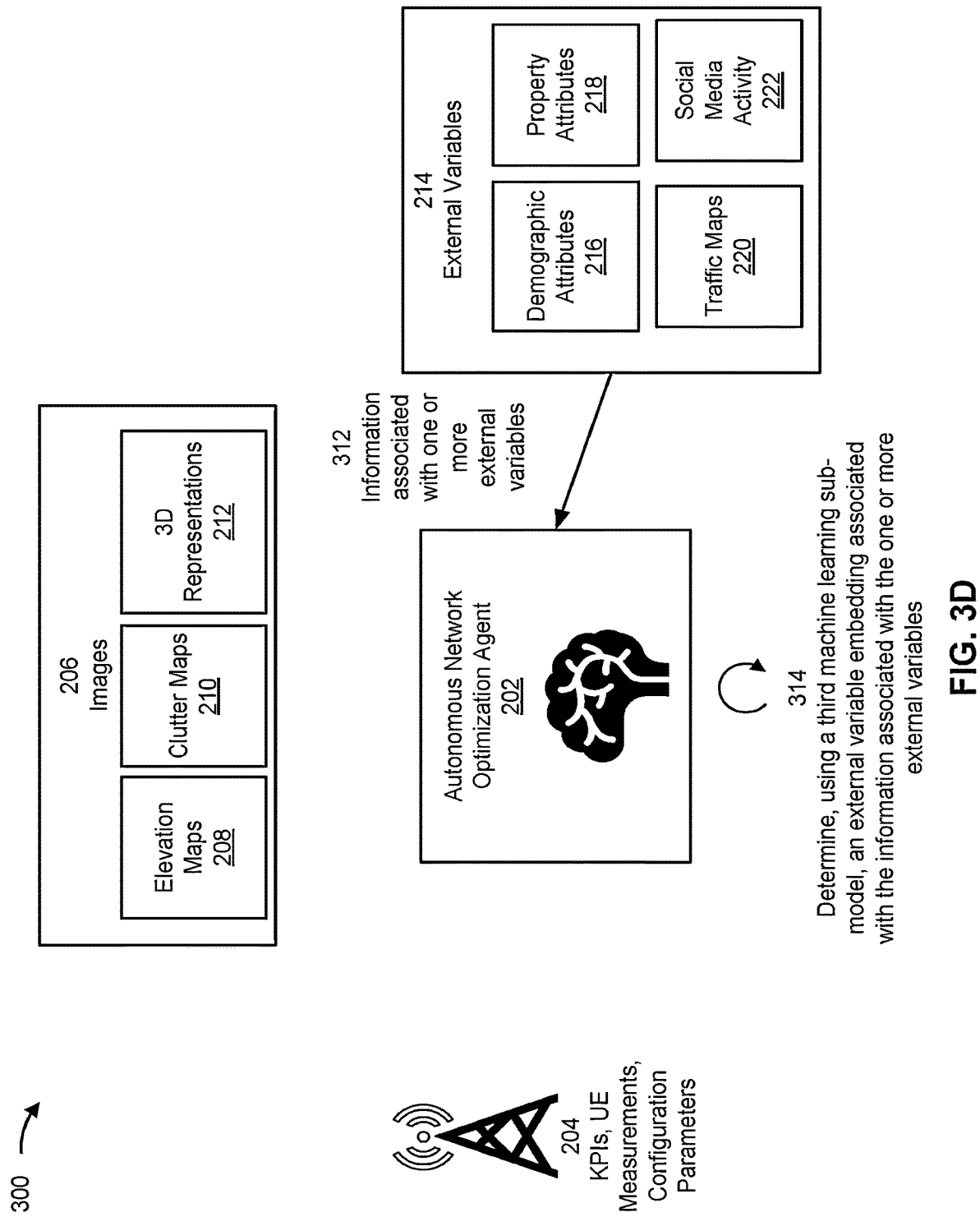

The autonomous network optimization agent 202 may be configured to receive additional inputs and/or to determine additional embeddings using various other machine-learning sub-models. For example, as shown in FIG. 3D and as indicated by reference number 312, the autonomous network optimization agent 202 may receive information associated with one or more external variables associated with the network node, such as information associated with one or more external variables described above in connection with reference number 214. Based on or more of the machine learning techniques described above in connection with the KPI embedding, the RF environment embedding, or a similar machine learning technique, the autonomous network optimization agent 202 may determine, using a third machine learning sub-model, an external variable embedding associated with the information associated with the one or more external variables, as shown by reference number 314. The autonomous network optimization agent 202 may continue in a like manner by receiving additional information and determining associated embeddings, thereby utilizing multiple modalities from which to optimize one or more communication parameters.

Figure 3E:
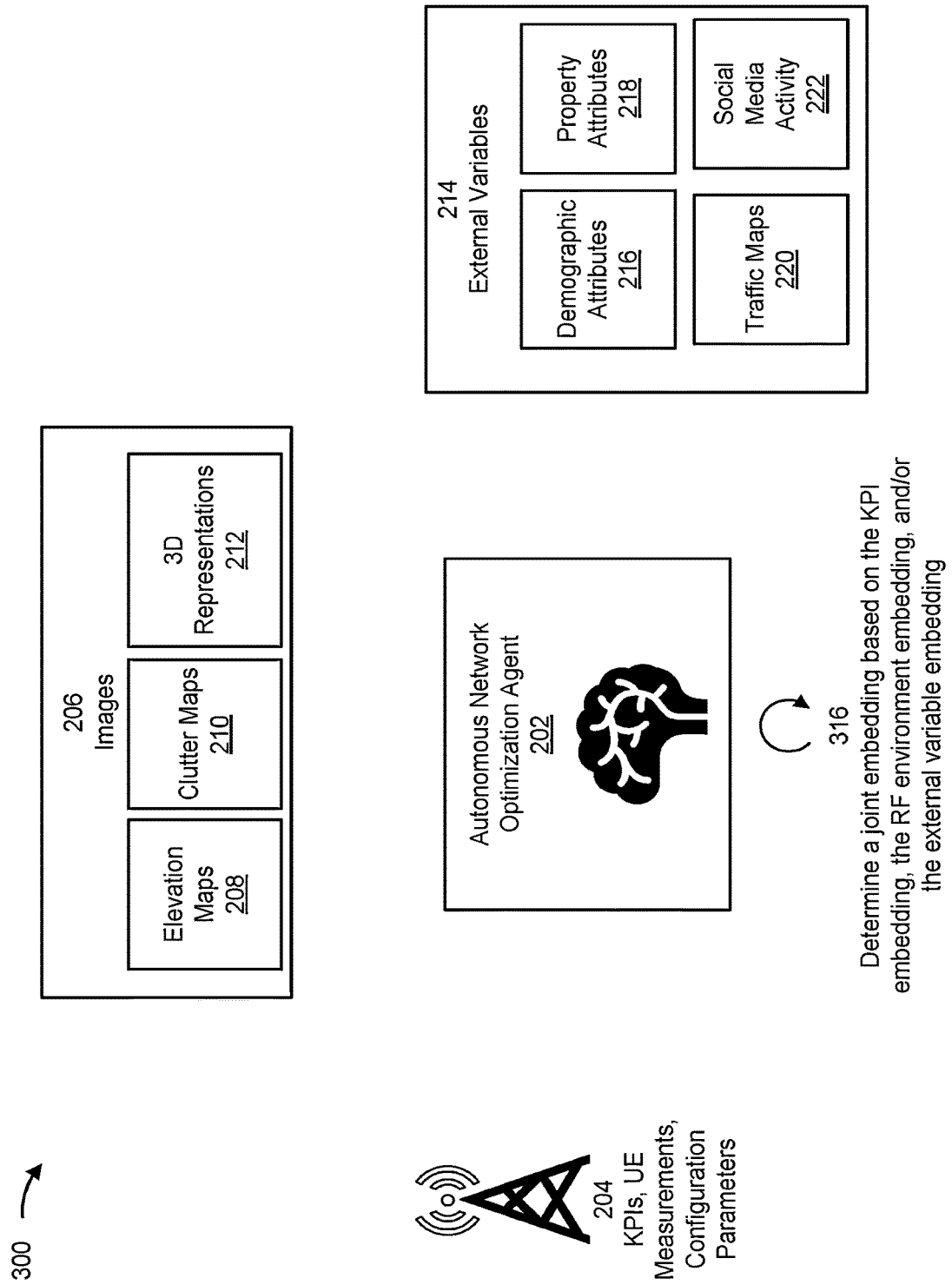

In some implementations, the autonomous network optimization agent 202 may be configured to combine the various embeddings described above to form a joint embedding, and/or the autonomous network optimization agent 202 may perform joint learning of the sub-models using a machine learning model. More particularly, as shown in FIG. 3E, and as indicated by reference number 316, the autonomous network optimization agent 202 may determine a joint embedding based on two or more embeddings outputted from one or more of the machine learning sub-models described above, such as two or more of the KPI embedding, the RF environment embedding, the external variable embedding, or a similar embedding. In some implementations, the autonomous network optimization agent 202 may pretrain unimodal models (e.g., the various sub-models described above) and combine them at a higher level to build a joint embedding space using multimodal fusion techniques such as concatenation of embedding vectors or another multimodal fusion technique. In some other implementations, the autonomous network optimization agent 202 may perform the composition of unimodal models (e.g., create the joint embedding space) and train the joint model instead of doing pretraining unimodally.

In some implementations, the autonomous network optimization agent 202 may perform multimodal vector space arithmetic based on the joint embedding. By way of example, in some implementations the autonomous network optimization agent 202 may be configured to create a first joint embedding associated with a first cell (referred to herein as "Cell A" for ease of discussion) and a second joint embedding associated with a second cell (referred to herein as "Cell B" for ease of discussion). To do so, the autonomous network optimization agent 202 may, for each cell, add a vector representation of a satellite image associated with the cell (e.g., an RF environment embedding), a vector representation of population densities or similar information associated with the cell (e.g., an external variable embedding), and a vector representation of KPIs associated with the cell (e.g., a KPI embedding) to form a joint embedding associated with the cell. In such examples, if Cell A and Cell B have similar configuration parameters and similar population densities but are exhibiting different performance metrics (e.g., KPIs), the autonomous network optimization agent 202 may determine that the performance difference can be explained by the differences in RF environments (e.g., Cell A and Cell B may not be in the same vector representation cluster for RF environments, resulting in difference performance levels notwithstanding that the cells are similarly configured).

Additionally, or alternatively, in some implementations the autonomous network optimization agent 202 may perform clustering on the joint embedding using at least one clustering algorithm. For example, the autonomous network optimization agent 202 may perform, on the joint embedding, one or more of a K-means clustering algorithm, a density-based spatial clustering of applications with noise (DBSCAN) clustering algorithm, a Gaussian mixture cluster algorithm, an ordering points to identify the clustering structure (OPTICS) clustering algorithm, a Clustergram clustering algorithm, or a similar clustering algorithm. In some implementations, such as when the autonomous network optimization agent 202 utilizes the K-means clustering algorithm, the DBSCAN clustering algorithm, the Gaussian mixture cluster algorithm, and/or the OPTICS clustering algorithm, the autonomous network optimization agent 202 may specify a number of clusters associated with the joint embedding when performing the clustering. In some other implementations, such as when the autonomous network optimization agent 202 utilizes the Clustergram algorithm, the autonomous network optimization agent 202 may not need to specify the number of clusters. That is, the Clustergram algorithm may not have a requirement to specify a number of clusters because Clustergram is a two-dimensional plot capturing the flows of observations between classes as more clusters are added. In some implementations, the Clustergram algorithm may be utilized to provide feedback as to how data reshuffles as more clusters are added and/or how a quality of splits between clusters.

Figure 3F:
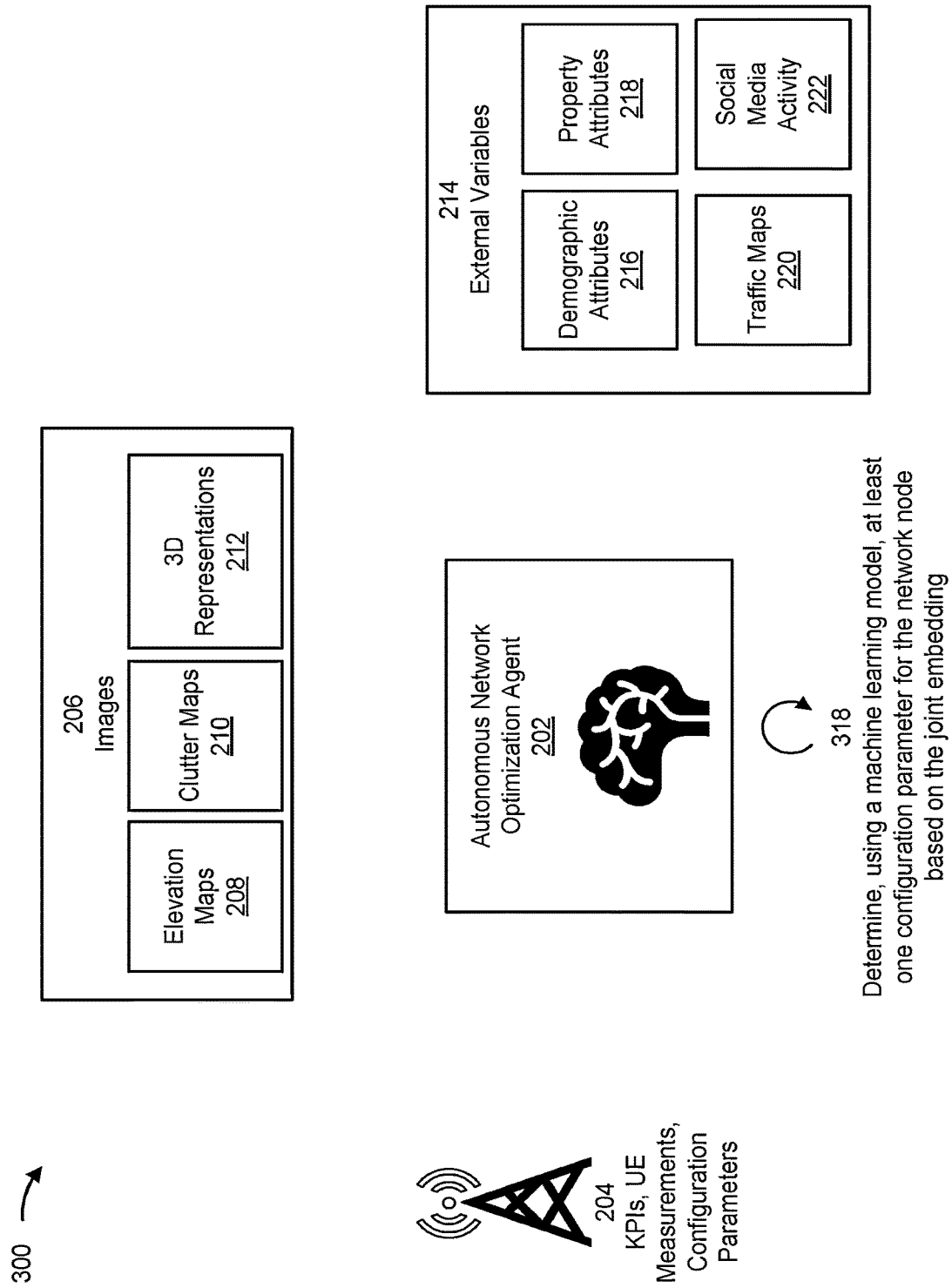

As shown in FIG. 3F, and as indicated by reference number 318, the autonomous network optimization agent 202 may determine, using a machine learning model, at least one configuration parameter for the network node 110 based on the joint embedding. That is, the autonomous network optimization agent 202 may autonomously configure the network node 110 based on the multimodal input. In this way, when a first cell (e.g., Cell A in the above example) and a second cell (e.g., Cell B in the above example) are deployed in similar population densities or the like, but in different RF environments, the autonomous network optimization agent 202 may configure each cell differently in order to maximize performance for the corresponding RF environment.

Figure 3G:
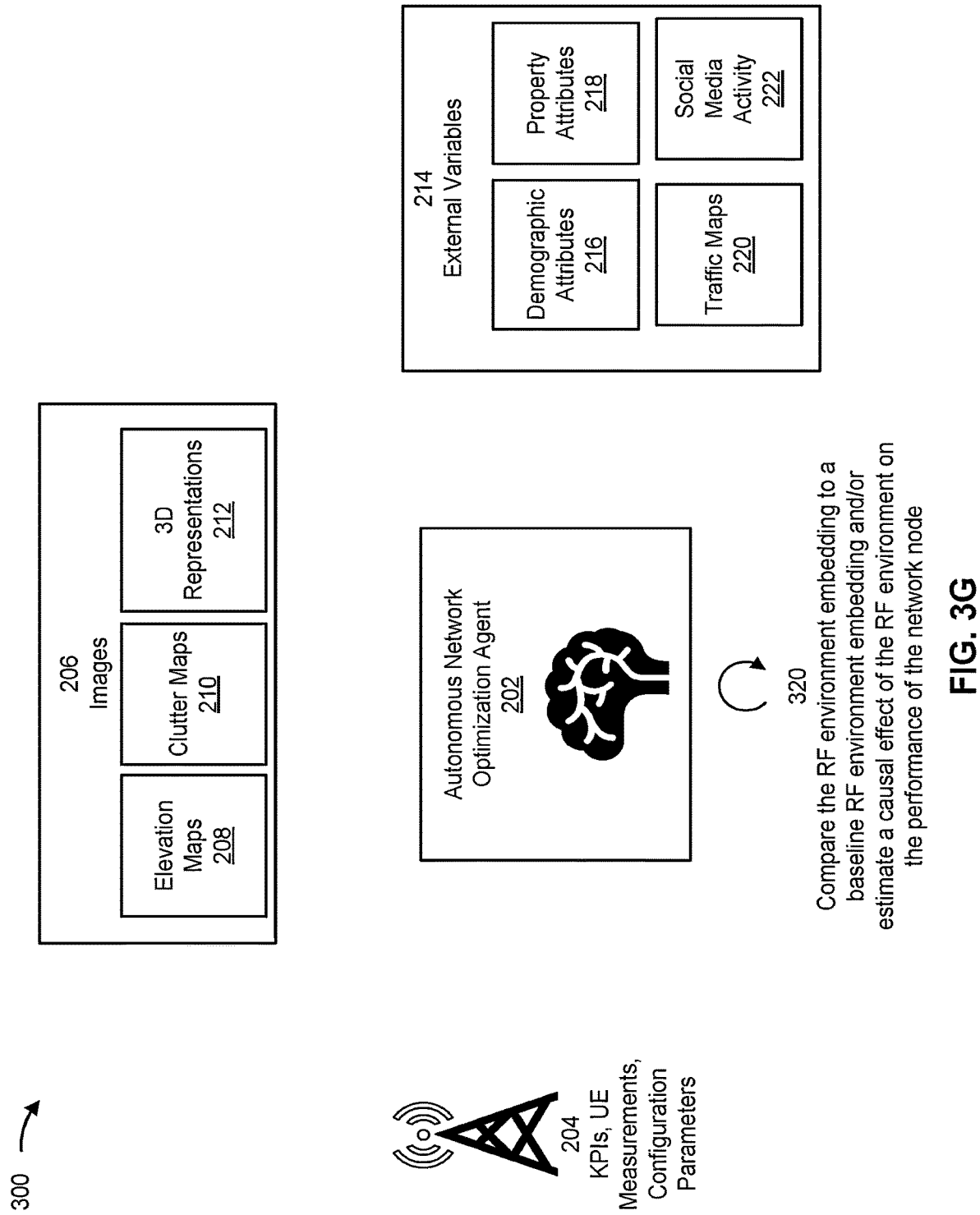

Additionally, or alternatively, the autonomous network optimization agent 202 may estimate causal effects of an RF environment on a given cell's performance. For example, as shown in FIG. 3G, and as indicated by reference number 320, the autonomous network optimization agent 202 may compare an RF environment embedding to a baseline RF environment embedding and thus estimate a causal effect of the RF environment on performance of the network node 110 based on comparing the RF environment embedding to the baseline RF environment embedding. More particularly, the autonomous network optimization agent 202 may define an ideal baseline RF environment for one or more cell types, such as an RF environment that includes no elevations, structures, vegetation, or the like. The autonomous network optimization agent 202 may determine an RF environment embedding associated with the ideal RF environment (e.g., a baseline RF environment embedding). The autonomous network optimization agent 202 may design and/or compute an appropriate similarity measure for comparing the RF environment embedding to the baseline RF environment embedding, such as a Euclidian distance similarity measure, a dot product similarity measure, a Wasserstein similarity metric measure, or a similar similarity measure.

In this way, the autonomous network optimization agent 202 may enable an objective method, based on explicit numerical criteria, to explain the impact of the RF environment on radio network performance. In some implementations, the autonomous network optimization agent 202 may enable the use of a sinusoidal representation network associated with a neural network having periodic activation functions (e.g., sine waves) as nonlinearities in order to capture high-frequency details of the environment of the high band 5G cells (e.g., 24 GHZ). The autonomous network optimization agent 202 may enable the use of multiple modalities to make an autonomous optimization system more precise and robust with fine-grained auto-discovery of the RF environmental features. In this way, the autonomous network optimization agent 202 may enable enhancement of the radio network performance by having cells with similar RF environments (as objectively and/or numerically determined) sharing the same configuration parameters. As a result, communication parameters of network nodes may be optimized, resulting in increased network throughput, decreased network latency, and/or decreased communication errors resulting in decreased power, computing, and/or network resource consumption that would otherwise be required for correcting communication errors.

As indicated above, FIGS. 3A-3G are provided as an example. Other examples may differ from what is described with regard to FIGS. 3A-3G. The number and arrangement of devices shown in FIGS. 3A-3G are provided as an example. In practice, there may be additional devices, fewer devices, different devices, or differently arranged devices than those shown in FIGS. 3A-3G. Furthermore, two or more devices shown in FIGS. 3A-3G may be implemented within a single device, or a single device shown in FIGS. 3A-3G may be implemented as multiple, distributed devices. Additionally, or alternatively, a set of devices (e.g., one or more devices) shown in FIGS. 3A-3G may perform one or more functions described as being performed by another set of devices shown in FIGS. 3A-3G.

Figure 4:
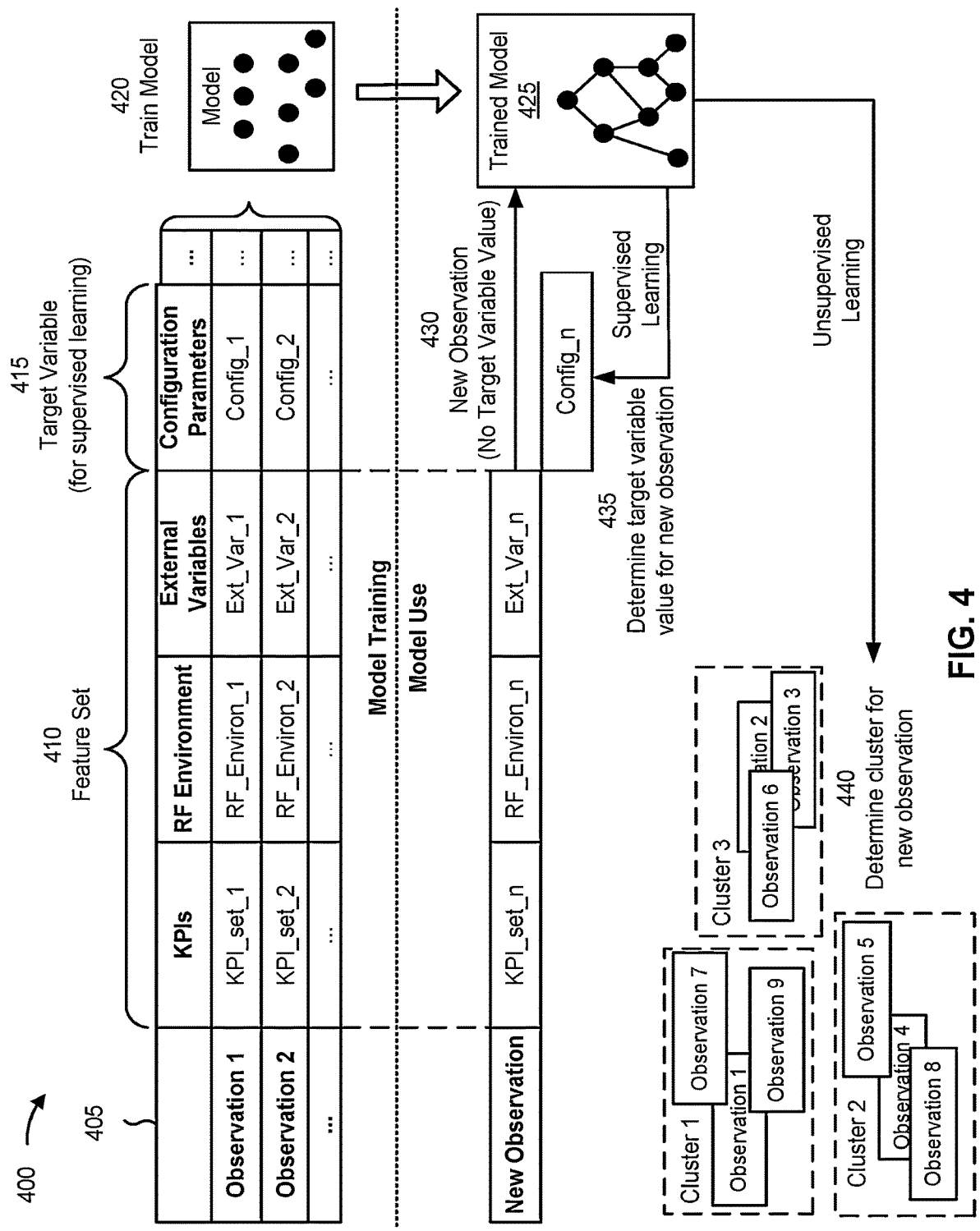
FIG. 4 is a diagram illustrating an example of training and using a machine learning model in connection with systems and methods for configuring a network node based on an RF environment.

FIG. 4 is a diagram illustrating an example 400 of training and using a machine learning model in connection with systems and methods for configuring a network node based on an RF environment. The machine learning model training and usage described herein may be performed using a machine learning system. The machine learning system may include or may be included in a computing device, a server, a cloud computing environment, or the like, such as a core network device and/or function described in more detail elsewhere herein. Additionally, or alternatively, the machine learning system may be the autonomous network optimization agent 202 and/or may be associated with the autonomous network optimization agent 202. In some implementations, the machine learning system may be associated with a multimodal AI system and/or may implement multiple machine learning sub-models, as described above in connection with FIGS. 2-3G.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from a UE 105, a network node 110, a core network device, and/or a device associated with a data network, as described elsewhere herein.

As shown by reference number 410, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a UE 105, a network node 110, a core network device, and/or a device associated with a data network. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a set of KPIs or similar performance data associated with a cell 115 and/or a network node 110, a second feature of RF environment information (e.g., a satellite image of an RF environment) associated with the cell 115 and/or the network node 110, a third feature of information associated with external variables associated with the cell 115 and/or the network node 110, and so on. As shown, for a first observation, the first feature may have a value of KPI_set_1, the second feature may have a value of RF_Environ_1, the third feature may have a value of Ex_Var_1, and so on. These features and feature values are provided as examples, and may differ in other examples. For example, the feature set may include one or more of the features described above in connection with reference number 204, reference number 206, and/or reference number 214, among other examples. In some implementations, the machine learning system may include one or more machine learning sub-models used to create a corresponding embedding (e.g., vector representation) of each set of data associated with the feature set. For example, as described above in connection with FIGS. 2-3G, the machine learning system may include a first machine learning sub-model used to create a KPI embedding from the KPI data or other performance data, the machine learning system may include a second machine learning sub-model used to create an RF environment embedding from the RF environment information, and/or the machine learning system may include a third machine learning sub-model used to create an external variable embedding from the information associated with the external variables.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is one or more configuration parameters associated with the network node 110 (e.g., a numerical representation of configuration parameters associated with the cell 115 and/or the network node 110), which has a value of Config_1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations. In some other implementations, the machine learning model may use other learning techniques, such as reinforcement learning or a similar technique.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, as described above in connection with FIGS. 2-3G, the machine learning system may be associated with one or more machine learning models that perform clustering or other machine learning algorithms on a joint embedding (e.g., an embedding formed from two or more of the KPI embedding, the RF environment embedding, the external variable embedding, or the like). After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of KPI_set_n, a second feature of RF_Environ_n, a third feature of Ext_Var_n, and so on, as an example. The machine learning system may apply the trained machine learning model 425 to the new observation to generate an output (e.g., a result, such as a predicted configuration to optimize cell performance). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of Config_n for the target variable of the configuration parameters for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation and/or automated action may include, for example, adjusting a configuration parameter of a network node 110 in order to optimize cell performance in the predicted RF environment associated with the cell, or other like.

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster (e.g., a first RF environment type, such as a forested region), then the machine learning system may provide a first recommendation, such as to adjust configuration parameters that optimize cell performance in heavily vegetated areas. Additionally, or alternatively, the machine learning system may perform a first automated action and/or may cause a first automated action to be performed (e.g., by instructing another device to perform the automated action) based on classifying the new observation in the first cluster, such as to adjust configuration parameters that optimize cell performance in heavily vegetated areas.

As another example, if the machine learning system were to classify the new observation in a second cluster (e.g., a second RF environment, such as an urban environment with many buildings), then the machine learning system may provide a second (e.g., different) recommendation and/or automated action, such as adjusting configuration parameters that optimize cell performance in heavily populated and/or urban areas.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 425 may be re-trained using feedback information. For example, feedback may be provided to the machine learning model. The feedback may be associated with actions performed based on the recommendations provided by the trained machine learning model 425 and/or automated actions performed, or caused, by the trained machine learning model 425. In other words, the recommendations and/or actions output by the trained machine learning model 425 may be used as inputs to re-train the machine learning model (e.g., a feedback loop may be used to train and/or update the machine learning model). For example, the feedback information may include performance metrics associated with a cell 115 and/or network node 110 after reconfiguration, such that the trained machine learning model 425 may adjust recommendations and/or automated actions in the future in order to optimize the configuration parameters for various RF environmental settings.

In this way, the machine learning system may apply a rigorous and automated process to optimize configuration parameters of a network node 110 based on an RF environment and/or to determine a causality of an RF environment on a network node 110's performance. The machine learning system may enable recognition and/or identification of tens, hundreds, thousands, or millions of features and/or feature values for tens, hundreds, thousands, or millions of observations, thereby increasing accuracy and consistency and reducing delay associated with optimizing configuration parameters of a network node 110 based on an RF environment, and/or determining a causality of an RF environment on a network node 110's performance relative to requiring computing resources to be allocated for tens, hundreds, or thousands of operators to manually optimize configuration parameters of a network node 110 based on an RF environment and/or determining a causality of an RF environment on a network node 110's performance using the features or feature values.

As indicated above, FIG. 4 is provided as an example. Other examples may differ from what is described in connection with FIG. 4.

Figure 5:
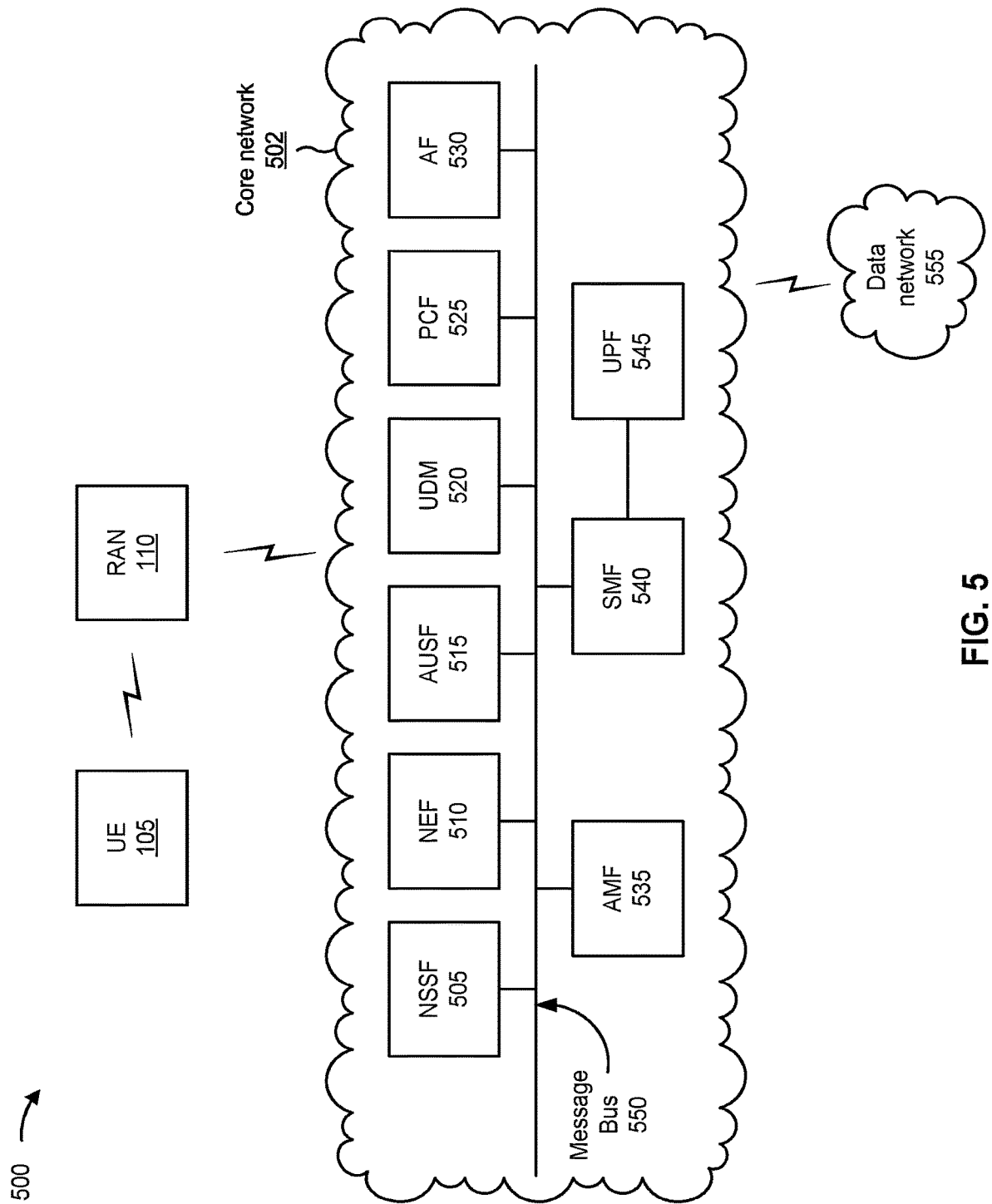
FIG. 5 is a diagram of an example environment in which systems and/or methods described herein may be implemented.

FIG. 5 is a diagram of an example environment 500 in which systems and/or methods described herein may be implemented. As shown in FIG. 5, example environment 500 may include a UE 105, a network node 110 (e.g., a RAN device), a core network 502, and a data network 555. Devices and/or networks of example environment 500 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The network node 110 may support, for example, a cellular radio access technology (RAT). The network node 110 may include one or more base stations that may be associated with a physical device or a virtual device and/or a virtual network function (VNF) (e.g., base transceiver stations, radio base stations, node Bs, eNBs, gNBs, base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The network node 110 may transfer traffic between the UE 105 (e.g., using a cellular RAT), one or more base stations (e.g., using a wireless interface or a backhaul interface, such as a wired backhaul interface), and/or the core network 502. The network node 110 may provide one or more cells that cover geographic areas.

In some implementations, the network node 110 may perform scheduling and/or resource management for the UE 105 covered by the network node 110 (e.g., the UE 105 covered by a cell 115 provided by the network node 110). In some implementations, the network node 110 may be controlled or coordinated by a network controller, which may perform load balancing, network-level configuration, and/or other operations. The network controller may communicate with the network node 110 via a wireless or wireline backhaul. In some implementations, the network node 110 may include a network controller, a self-organizing network (SON) module or component, or a similar module or component. In other words, the network node 110 may perform network control, scheduling, and/or network management functions (e.g., for uplink, downlink, and/or sidelink communications of the UE 105 covered by the network node 110).

In some implementations, the core network 502 may include an example functional architecture in which systems and/or methods described herein may be implemented. For example, the core network 502 may include an example architecture of a 5G next generation (NG) core network included in a 5G wireless telecommunications system. While the example architecture of the core network 502 shown in FIG. 2 may be an example of a service-based architecture, in some implementations, the core network 502 may be implemented as a reference-point architecture and/or a 4G core network, among other examples.

As shown in FIG. 5, the core network 502 may include a number of functional elements. The functional elements may include, for example, a network slice selection function (NSSF) 505, a network exposure function (NEF) 510, an authentication server function (AUSF) 515, a unified data management (UDM) component 520, a policy control function (PCF) 525, an application function (AF) 530, an access and mobility management function (AMF) 535, a session management function (SMF) 540, and/or a user plane function (UPF) 545. These functional elements may be communicatively connected via a message bus 550. Each of the functional elements shown in FIG. 5 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 505 includes one or more devices that select network slice instances for the UE 105. By providing network slicing, the NSSF 505 allows an operator to deploy multiple substantially independent end-to-end networks potentially with the same infrastructure. In some implementations, each slice may be customized for different services.

The NEF 510 includes one or more devices that support exposure of capabilities and/or events in the wireless telecommunications system to help other entities in the wireless telecommunications system discover network services.

The AUSF 515 includes one or more devices that act as an authentication server and support the process of authenticating the UE 105 in the wireless telecommunications system.

The UDM 520 includes one or more devices that store user data and profiles in the wireless telecommunications system. The UDM 520 may be used for fixed access and/or mobile access in the core network 502.

The PCF 525 includes one or more devices that provide a policy framework that incorporates network slicing, roaming, packet processing, and/or mobility management, among other examples.

The AF 530 includes one or more devices that support application influence on traffic routing, access to the NEF 510, and/or policy control, among other examples.

The AMF 535 includes one or more devices that act as a termination point for non-access stratum (NAS) signaling and/or mobility management, among other examples.

The SMF 540 includes one or more devices that support the establishment, modification, and release of communication sessions in the wireless telecommunications system. For example, the SMF 540 may configure traffic steering policies at the UPF 545 and/or may enforce user equipment Internet protocol (IP) address allocation and policies, among other examples.

The UPF 545 includes one or more devices that serve as an anchor point for intraRAT and/or interRAT mobility. The UPF 545 may apply rules to packets, such as rules pertaining to packet routing, traffic reporting, and/or handling user plane QoS, among other examples.

The message bus 550 represents a communication structure for communication among the functional elements. In other words, the message bus 550 may permit communication between two or more functional elements.

The data network 555 includes one or more wired and/or wireless data networks. For example, the data network 555 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example environment 500 may perform one or more functions described as being performed by another set of devices of example environment 500.

Figure 6:
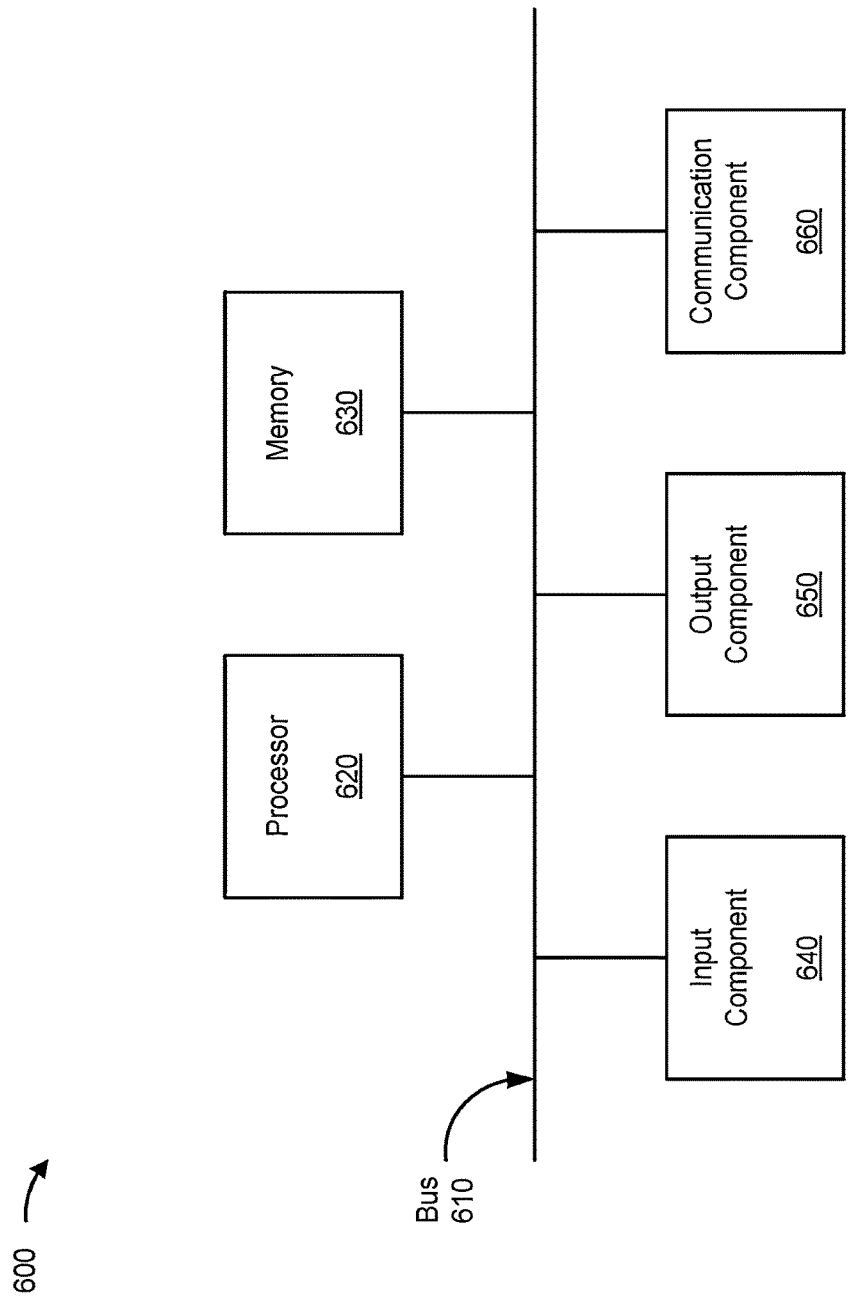
FIG. 6 is a diagram of example components of a device associated with configuring a network node based on an RF environment.

FIG. 6 is a diagram of example components of a device 600 associated with configuring a network node based on an RF environment. The device 600 may correspond to a UE 105, a network node 110, a core network 502 device, and/or a data network 555 device. In some implementations, a UE 105, a network node 110, a core network 502 device, and/or a data network 555 device may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
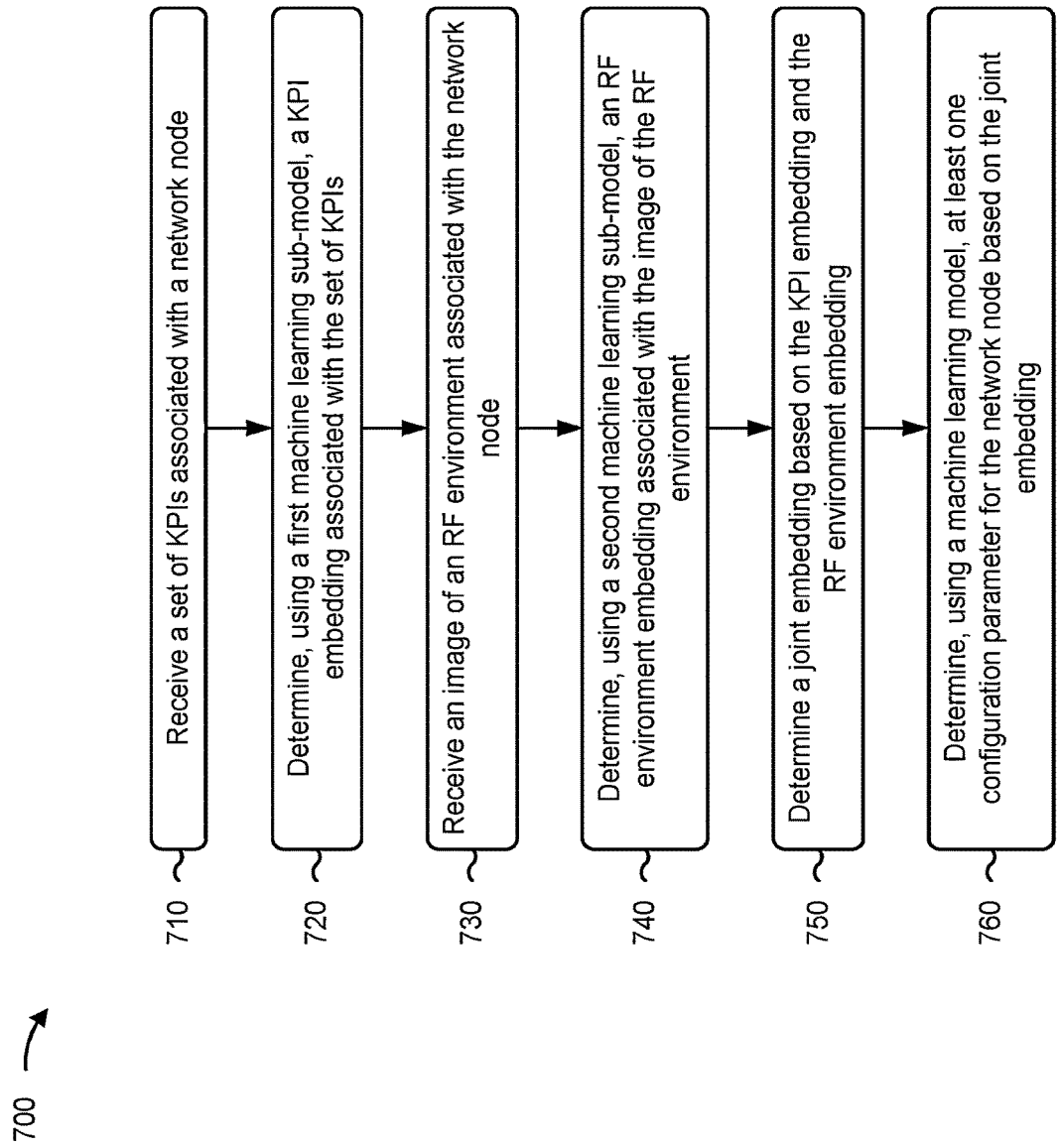
FIG. 7 is a flowchart of an example process associated with configuring a network node based on an RF environment.

FIG. 7 is a flowchart of an example process 700 associated with configuring a network node based on an RF environment. In some implementations, one or more process blocks of FIG. 7 may be performed by a network device (e.g., a device associated with the core network 502 and/or a device associated with the autonomous network optimization agent 202). In some implementations, one or more process blocks of FIG. 7 may be performed by another device or a group of devices separate from or including the network device, such as a network node (e.g., network node 110), and/or a data network device (e.g., a device associated with the data network 555). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving a set of KPIs associated with a network node (block 710). For example, the network device may receive a set KPIs associated with a network node, as described above. In some implementations, process 700 includes collecting performance data from the network node, wherein the set of KPIs is based on the performance data.

As further shown in FIG. 7, process 700 may include determining a KPI embedding associated with the set of KPIs (block 720). For example, the network device may determine a KPI embedding associated with the set of KPIs, as described above. In some implementations, determining the KPI embedding associated with the set of KPIs is performed using an autoencoder.

As further shown in FIG. 7, process 700 may include receiving an image of an RF environment associated with the network node (block 730). For example, the network device may receive an image of an RF environment associated with the network node, as described above. In some implementations, the image of the RF environment associated with the network node is associated with at least one of an elevation map, a clutter map, or a three-dimensional model. Additionally, or alternatively, process 700 may include receiving, by the network device, another image, and extracting, by the network device, the image of the RF environment associated with the network node from the other image.

As further shown in FIG. 7, process 700 may include determining an RF environment embedding associated with the image of the RF environment (block 740). For example, the network device may determine an RF environment embedding associated with the image of the RF environment, as described above. In some implementations, determining the RF environment embedding associated with the image of the RF environment is performed using representation learning. For example, the representation learning may be associated with at least one of a multilayer perceptron model, a convolution neural network model, or a vision transformer model. In some other implementations, determining the RF environment embedding associated with the image of the RF environment is performed using a sinusoidal representation network. Additionally, or alternatively, the RF environment embedding may be associated with a time of year. Moreover, process 700 may include determining, by the network device, a reconstruction quality of the RF environment embedding based on at least one of a peak signal-to-noise ratio or a structural similarity index measure. In some implementations, process 700 includes comparing, by the network device, the RF environment embedding to a baseline RF environment embedding, and estimating, by the network device, a causal effect of the RF environment on performance of the network node based on comparing the RF environment embedding to the baseline RF environment embedding.

In some implementations, process 700 includes receiving, by the network device, information associated with one or more external variables associated with the network node. Moreover, process 700 may include determining, by the network device using a third machine learning sub-model, an external variable embedding associated with the information associated with the one or more external variables.

As further shown in FIG. 7, process 700 may include determining a joint embedding based on the KPI embedding and the RF environment embedding (block 750) and a given multimodal fusion strategy, such as concatenation or a similar multimodal fusion strategy. For example, the network device may determine a joint embedding based on the KPI embedding and the RF environment embedding, as described above. In some implementations, the network device may determine the joint embedding further based on the external variable embedding. Additionally, or alternatively, process 700 may include performing, by the network device, clustering on the joint embedding using at least one clustering algorithm.

As further shown in FIG. 7, process 700 may include determining at least one configuration parameter for the network node based on the joint embedding (block 760). For example, the network device may determine at least one configuration parameter for the network node based on the joint embedding, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, a set of key performance indicators (KPIs) associated with a network node;
determining, by the network device using a first machine learning sub-model, a KPI embedding associated with the set of KPIs;
receiving, by the network device, an image of a radio frequency (RF) environment associated with the network node;
determining, by the network device using a second machine learning sub-model, an RF environment embedding associated with the image of the RF environment;
determining, by the network device, a joint embedding based on the KPI embedding and the RF environment embedding; and
determining, by the network device using a machine learning model, at least one configuration parameter for the network node based on the joint embedding.

2. The method of claim 1, wherein the image of the RF environment associated with the network node is associated with at least one of:
an elevation map,
a clutter map, or
a three-dimensional model.

3. The method of claim 1, further comprising:
receiving, by the network device, information associated with one or more external variables associated with the network node;
determining, by the network device using a third machine learning sub-model, an external variable embedding associated with the information associated with the one or more external variables; and
determining, by the network device, the joint embedding further based on the external variable embedding.

4. The method of claim 1, further comprising collecting performance data from the network node, wherein the set of KPIs is based on the performance data.

5. The method of claim 1, wherein determining the KPI embedding associated with the set of KPIs is performed using an autoencoder.

6. The method of claim 1, wherein determining the RF environment embedding associated with the image of the RF environment is performed using representation learning.

7. The method of claim 6, wherein the representation learning is associated with at least one of:
a multilayer perceptron model,
a convolution neural network model, or
a vision transformer model.

8. The method of claim 1, wherein determining the RF environment embedding associated with the image of the RF environment is performed using a sinusoidal representation network.

9. The method of claim 1, wherein the RF environment embedding is associated with a time of year.

10. The method of claim 1, further comprising determining, by the network device, a reconstruction quality of the RF environment embedding based on at least one of a peak signal-to-noise ratio or a structural similarity index measure.

11. The method of claim 1, further comprising:
receiving, by the network device, another image; and
extracting, by the network device, the image of the RF environment associated with the network node from the other image.

12. The method of claim 1, further comprising performing, by the network device, clustering on the joint embedding using at least one clustering algorithm.

13. The method of claim 1, further comprising:
comparing, by the network device, the RF environment embedding to a baseline RF environment embedding; and
estimating, by the network device, a causal effect of the RF environment on performance of the network node based on comparing the RF environment embedding to the baseline RF environment embedding.

14. A network device, comprising:
one or more processors configured to:
receive a set of key performance indicators (KPIs) associated with a network node;
determine a KPI embedding associated with the set of KPIs;
receive an image of a radio frequency (RF) environment associated with the network node;
determine an RF environment embedding associated with the image of the RF environment;
determine a joint embedding based on the KPI embedding and the RF environment embedding; and
determine at least one configuration parameter for the network node based on the joint embedding.

15. The network device of claim 14, wherein determining the KPI embedding associated with the set of KPIs is performed using an autoencoder.

16. The network device of claim 14, wherein determining the RF environment embedding associated with the image of the RF environment is performed using representation learning.

17. The network device of claim 14, wherein determining the RF environment embedding associated with the image of the RF environment is performed using a sinusoidal representation network.

18. A non-transitory computer-readable medium storing a set of instructions, the set of instructions comprising:
one or more instructions that, when executed by one or more processors of a network device, cause the network device to:
receive a set of key performance indicators (KPIs) associated with a network node;
determine a KPI embedding associated with the set of KPIs;
receive an image of a radio frequency (RF) environment associated with the network node;

determine an RF environment embedding associated with the image of the RF environment;

determine a joint embedding based on the KPI embedding and the RF environment embedding; and determine at least one configuration parameter for the network node based on the joint embedding.

19. The non-transitory computer-readable medium of claim 18, wherein the one or more instructions further cause the network device to perform clustering on the joint embedding using at least one clustering algorithm.

20. The non-transitory computer-readable medium of claim 18, wherein the one or more instructions further cause the network device to:

compare the RF environment embedding to a baseline RF environment embedding; and estimate a causal effect of the RF environment on performance of the network node based on comparing the RF environment embedding to the baseline RF environment embedding.

* * * * *